United States Patent [19]

Powers et al.

[11] Patent Number: 5,371,752

[45] Date of Patent: Dec. 6, 1994

[54] OPTICAL PARAMETRIC OSCILLATION USING KTA NONLINEAR CRYSTALS

[76] Inventors: Peter E. Powers, 305 Wyckoff Ave., Ithaca, N.Y. 14850; Lap K. Cheng, 66 Cypress Bridge Pl., Bear, Del. 19701-1014; Wayne S. Pelouch, 4725 Mesa Marcada Ct. NW., Albuquerque, N. Mex. 87120; Chung L. Tang, 212 Clark Hall, Cornell University, Ithaca, N.Y. 14853

[21] Appl. No.: 130,432

[22] Filed: Oct. 1, 1993

Related U.S. Application Data

[63] Continuation of Ser. No. 55,110, May 3, 1993, abandoned.

[51] Int. Cl.$^5$ .......................... H01S 3/10; H03F 7/00
[52] U.S. Cl. ......................... 372/25; 359/330; 372/20; 372/21
[58] Field of Search ............ 372/20, 21, 25, 72, 372/41; 359/328, 330

[56] References Cited

U.S. PATENT DOCUMENTS

| | | | |
|---|---|---|---|
| 4,485,473 | 11/1984 | Tang et al. | 372/18 |
| 4,639,923 | 1/1987 | Tang et al. | 372/21 |
| 5,017,806 | 5/1991 | Edelstein et al. | 307/428 |
| 5,033,057 | 7/1991 | Bosenberg et al. | 372/72 |
| 5,034,951 | 7/1991 | Edelstein et al. | 372/22 |
| 5,047,668 | 9/1991 | Bosenberg | 359/330 |
| 5,053,641 | 10/1991 | Cheng et al. | 359/330 |
| 5,095,491 | 3/1992 | Kozlovsky et al. | 372/94 |
| 5,111,468 | 5/1992 | Kozlovsky et al. | 372/32 |
| 5,191,588 | 3/1993 | Dacquay | 372/22 |
| 5,291,503 | 3/1994 | Geiger et al. | 372/21 |
| 5,296,960 | 3/1994 | Ellingson et al. | 359/330 |

OTHER PUBLICATIONS

Spence et al., "Regeneratively Initiated Self-mode-locked Ti:sapphire Laser", Optics Letter, vol. 16, No. 22, Nov. 15, 1991, pp. 1762–1764.
Laenen et al., "Broadly Tunable Femtosecond Pulses Generated by Optical Parametric Oscillation", Optics Letters, Sep. 1, 1990, vol. 15, No. 17, pp. 971–973.
Mak et al., "Externally Pumped High Repetition Rate Femtosecond Infrared Optical Parametric Oscillator", Appl. Phys. Lett. 60 (5), 3 Feb. 1992.
Spence et al., "60-fsec Pulse Generation From a Self-mode-locked Ti: Sapphire Laser", Optics Letters, vol. 16, No. 1, Jan. 1, 1991, p. 42–44.

Primary Examiner—James W. Davie
Attorney, Agent, or Firm—Jones, Tullar & Cooper

[57] ABSTRACT

A continuous wave tunable femtosecond optical parametric oscillator includes an oscillator cavity including a pumping cavity. A nonlinear KTiOAsO$_4$ crystal (KTA) is located in the pumping cavity and is pumped by a Ti:sapphire laser to produce output pulses having widths as short as 85 femtoseconds at wavelengths in the range 1.0 μm to 5.0 μm.

15 Claims, 4 Drawing Sheets

OPTICAL PARAMETRIC OSCILLATION USING KTA NONLINEAR CRYSTALS

This invention was made with government support under contract No. F49620-90-c-0039 awarded by the Air Force Office of Scientific Research (AFOSR), and Grant No. ECS-9108570, awarded by the National Science Foundation. The government has certain rights in the invention.

This is a continuation of copending application Ser. No. 08/055,110, filed on May 3, 1993, now abandoned.

BACKGROUND OF THE INVENTION

The present invention relates, in general, to a continuous wave femtosecond optical parametric oscillator (OPO) having high power, short pulses, and broad tunability. More particularly, the invention is directed to an optical parametric oscillator with enhanced performance which utilizes a KTA nonlinear crystal.

The recent development of externally pumped high-repetition-rate femtosecond (fsec) optical parametric oscillators using $KTiOPO_4$(KTP) has demonstrated the feasibility of a broadly tunable high-repetition-rate femtosecond light source. Laser pulses in the femtosecond time domain; i.e., pulses having widths of $10^{-15}$ to $10^{-13}$ seconds, are important tools for use in studying extremely short-variation events such as chemical reactions, for by directing femtosecond pulses at reacting chemicals, for example, researchers can capture spectroscopic information about the structure and behavior of short-lived molecular intermediates of the reactions. Femtosecond lasers are also important for studying the dynamics and the ultimate limits of high-speed semiconductor electronic and optical devices. However, numerous ultrafast phenomena have been inaccessible to direct optical study due to a lack of light sources having appropriate wavelengths or other suitable characteristics such as tunability or a high repetition rate. The potential tuning range of the femtosecond KTP optical parametric oscillator, which is such a high-repetition-rate femtosecond source, is from approximately 0.95 $\mu$m to about 4 $\mu$m with an absorption band around 3.5 $\mu$m, and such a source has been extremely valuable in conducting a variety of optical studies. However, there is a need for a high power source of optical pulses which will not only be tunable, but which will have a range beyond that presently available from currently available KTP optical parametric oscillators, and which will have pulse widths as short as 84 fsec.

SUMMARY OF THE INVENTION

Briefly, the present invention is directed to a femtosecond optical parametric oscillator utilizing a $KTiOAsO_4$ (KTA) nonlinear crystal. Such a crystal may be located, for example, in a pumping cavity of a linear optical parametric oscillator and may be optically pumped with, for example, a Ti:sapphire laser. KTA has a transparency range extending out to 5.3 $\mu$m, with no absorption in the 3.5 $\mu$m region, and can be tuned over its whole transparency range, thereby permitting it to produce outputs in the important 4 to 5 $\mu$m region, which is inaccessible to KTP. KTA can also tune in the 3.5 $\mu$m region, where KTP has an absorption band, so that this material has the potential for tuning to wavelengths not available with KTP optical parametric oscillators.

BRIEF DESCRIPTION OF THE DRAWINGS

The foregoing and additional objects, features and advantages of the invention will become apparent to those who are skilled in the art from a consideration of the following detailed description of a preferred embodiment thereof, taken in conjunction with the accompanying drawings, in which.

DESCRIPTION OF PREFERRED EMBODIMENT

Figure 1:
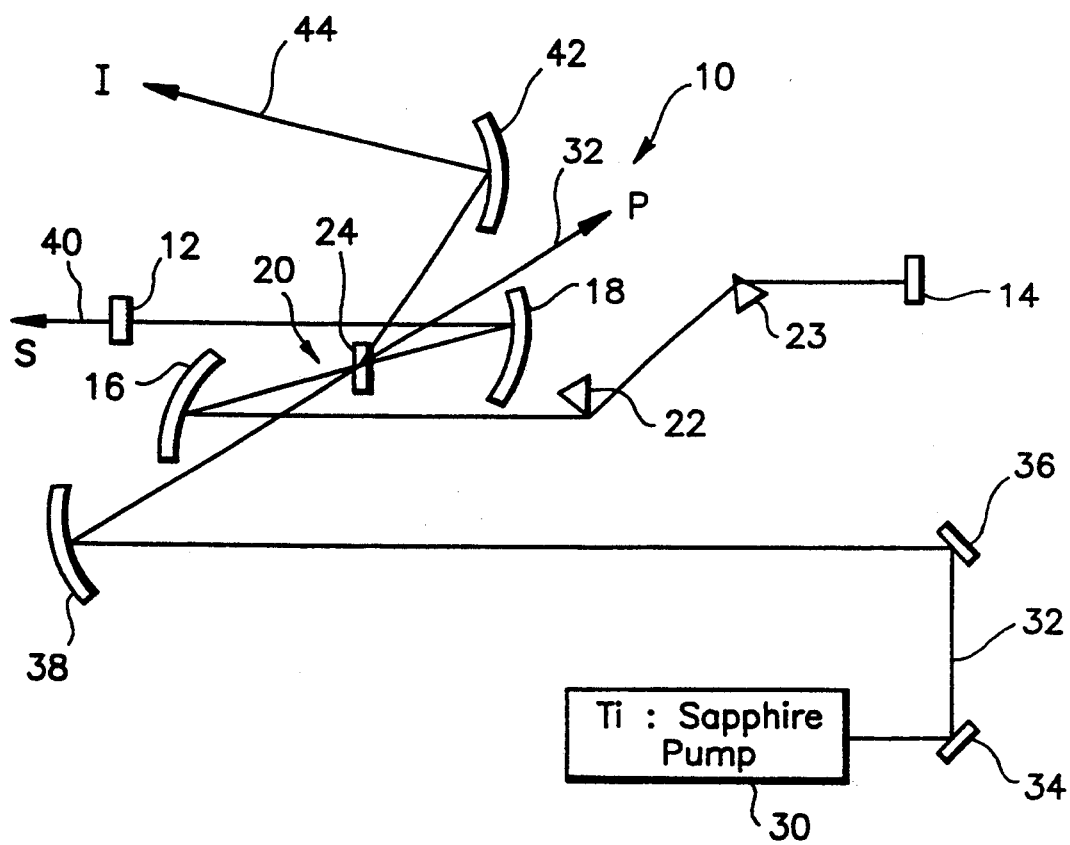
FIG. 1 is a diagrammatic illustration of a Ti:sapphire-pumped femtosecond KTA optical parametric oscillator in accordance with the invention.

Referring now to FIG. 1, an optical parametric oscillator (OPO) generally indicated at 10 includes a linear cavity defined by a pair of flat end mirrors 12 and 14, and a pair of intermediate curved mirrors 16 and 18. The two curved mirrors 16 and 18 each have a radius of curvature of, for example, r=10 cm and a high reflection coating from 1.2 to 1.5 $\mu$m, and define a pumping cavity 20 which includes a nonlinear KTA crystal (to be described). Flat mirror 12 is a 1% output coupler which, in one example of the invention, covers a range from 1.3 to 1.4 $\mu$m, while flat mirror 14 is a high reflector with the same coating as the curved mirrors. An intracavity dispersion compensating prism sequence consisting of two SF 14 prisms 22 and 23 is located in the cavity, for example between mirrors 14 and 16, the prisms being spaced at 20 cm and arranged so that they can be inserted or removed from the cavity 10.

Figure 2:
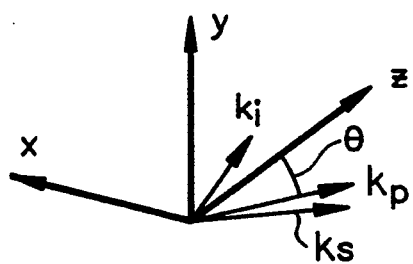
FIG. 2 illustrates the pertinent angles of the crystal used in the oscillator of FIG. 1.

A nonlinear optical crystal 24 is located in the pump cavity 20, between mirrors 16 and 18, and is aligned with the cavity so that the pump (to be described) is an o wave, the resonated signal (S) is an e wave, and the nonresonated idler (I) is an o wave. The polarization direction for the o waves is along the Y axis of the crystal (FIG. 2) and the polarization direction of the e wave is in the X–Z plane. The crystal is $KTiOAsO_4$, which is a crystal similar to KTP, but which has an optical nonlinearity approximately 20% larger and an infrared transparency range nearly 1 $\mu$m broader. KTA is a positive biaxial crystal, with $n_z > n_y > \approx n_x$, where x, y, and z correspond to the piezoelectric axes of the crystal, illustrated in FIG. 2. In an experimental version of the optical parametric oscillator of the present invention, the KTA crystal was grown from a $K_5As_3O_{10}$ flux. The crystal was lightly doped (about 0.2 weight percentage) with indium to promote single-domain crystallization, it being found that indium doping does not affect the optical properties of KTA. As is the case with KTP, the effective optical nonlinearity $d_{eff}$ of the KTA crystal, differs, depending on the orientation of the crystal to a beam of light traveling through it, and is maximized for a type II interaction (o→e+o). In the experimental version, phase-matching was carried out in the x–z plane so that direct comparison of the performance of the KTA optical parametric oscillator could be made with that of prior KTP optical parametric oscillators. In this experimental set-up, $k_p$, $k_s$, and $k_i$ were in the $\phi=0$ plane. Since $d_{24} > d_{15}$ and $(n_z - n_y) < (n_z - n_x)$ in KTA, this configuration also maximizes the $d_{\mathit{eff}}$ coefficient, which in the x–z plane is given by: $d_{\mathit{eff}} = d_{24}\sin\Theta$, where $\Theta$ is also illustrated in FIG. 2. The crystal 24 in the experimental set-up was 1.47 mm thick, cut at $\Theta = 50°$, and anti-reflection coated on both surfaces from 1.3 $\mu$m to 1.6 $\mu$m. The crystal had a reflection loss of 14% per surface at the pump wavelength.

The optical parametric oscillator 10 is pumped by a Ti:sapphire pump laser 30, the pumping beam 32 being directed by way of flat mirrors 34 and 36 and focusing mirror 38 into the pump cavity 20 and onto crystal 24. The mirror 38 has, for example, a curvature of r=15 cm, with the curvature of this mirror and pump cavity mirrors 16 and 18 being chosen so that the spot size of the pump and signal are matched in the crystal 24. The pump laser 30 preferably is a 1.2 W, 90 femtosecond laser operating at a wavelength of 780 nm. This produces a corresponding power inside the crystal of 1.0 W due to the reflection loss at the front surface of the crystal.

For the optical parametric oscillator 10, the e wave, or signal wave 40 is resonated within the cavity. Resonating the e wave results in a spacial walk-off of the e wave's Poynting vector from its wave vector inside the nonlinear crystal 24. Experimental studies have shown that the OPO operates so that the Poynting vectors of the resonated wave and the pump wave 32 are collinear. To accomplish this when resonating the e wave, a noncollinear phase-matching geometry is employed. Thus, the cavity mirrors 12, 14, 16, and 18 are placed so that the angle between the pump 32 and the signal wave 40 within the cavity is the negative of the Poynting vector walk-off. As a result, the Poynting vector of the e wave walks onto that of the pump.

Figure 3:
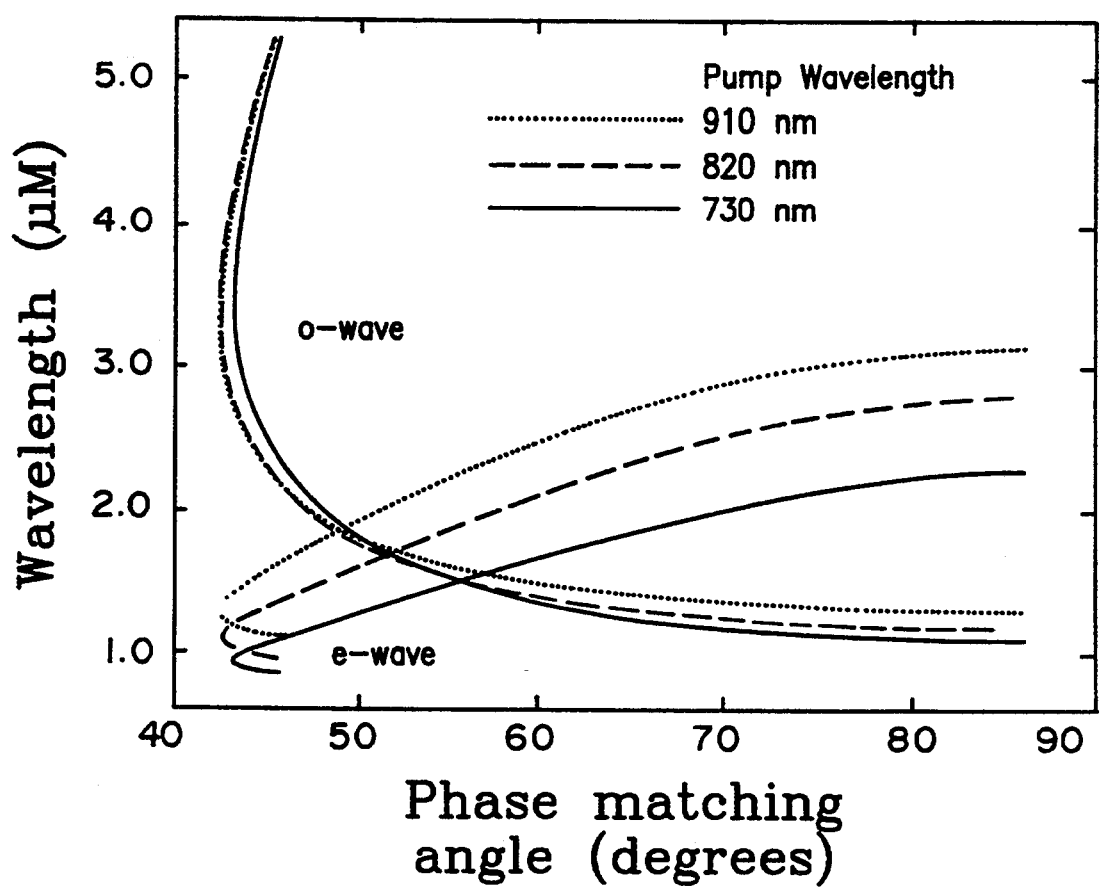
FIG. 3 illustrates a tuning curve for a type II interaction in KTA using a noncollinear angle of 2.0°.

The tuning curves for KTA calculated for various pump wave lengths are illustrated in FIG. 3. These curves are for wave lengths of 910 nm, 820 nm, and 730 nm, which are in the Ti:sapphire laser range.

A collimating mirror 42 is positioned to collimate and couple out the non-resonated o wave 44, which is the idler wave (I). The signal (S) in the illustrated embodiment, exits the cavity 10 through coupling mirror 12, while the pump beam (P) exits the cavity after passing through crystal 24.

Figure 4A:
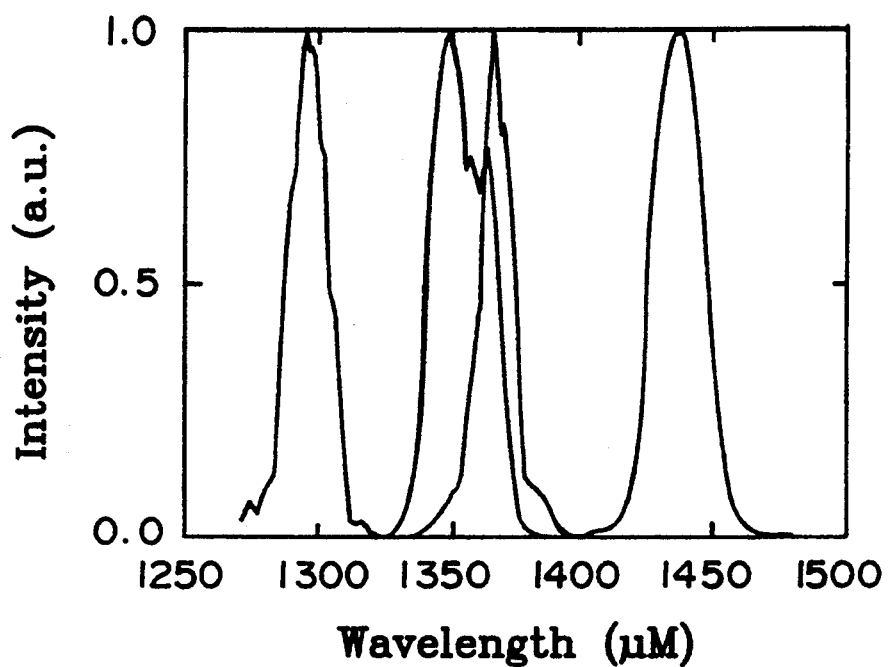
FIGS. 4A and 4B illustrate a small portion the spectra of the signal and idler waves, respectively, for a small portion of the tunning range of the oscillator of FIG. 1.
Figure 4B:
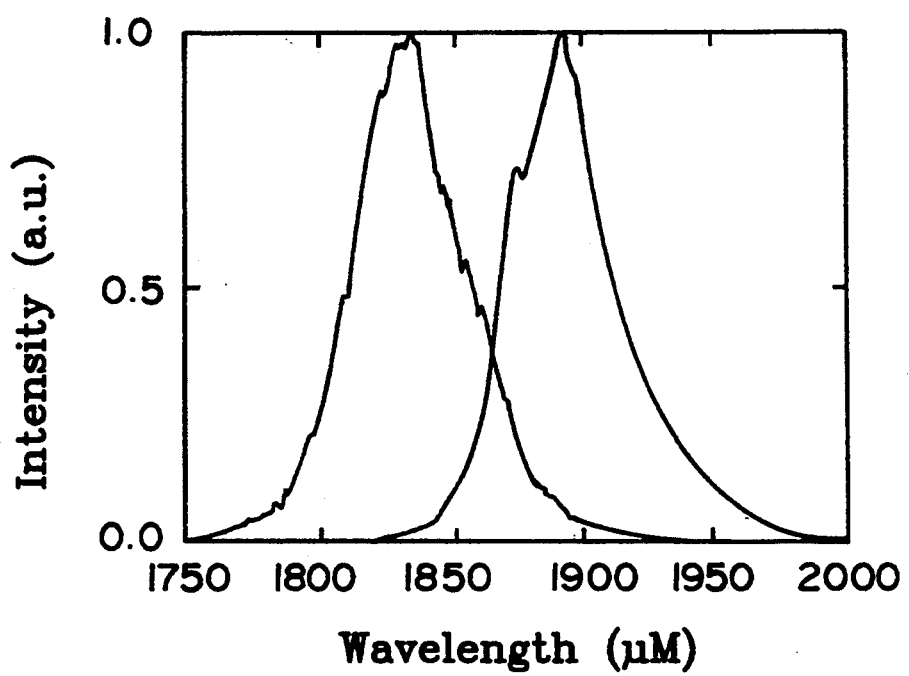

The phase-matched outputs of the OPO 10 are the resonated signal 40 and the nonresonated idler wave 44. The OPO may be tuned by either rotating the crystal 24 about its y-axis (angle tuning) or by tuning the pump source 30. The spectra for a small portion of the tuning range of the signal wave 40 and the idler wave 44 for the KTA optical parametric oscillator of FIG. 1 are illustrated in FIGS. 4A and 4B, respectively. The spectra of FIG. 4A illustrate tuning of the device by angle tuning from 1.29 to 1.44 $\mu$m in the signal branch, while FIG. 4B illustrates angle tuning from 1.83 to 1.91 $\mu$m in the idler branch. Tuning in this range is obtainable using one mirror set; additional wave lengths can be obtained using additional mirrors to extend the signal wave lengths to as high as 5 $\mu$m.

The signal 40 has two operating regimes: chirped and unchirped. The chirped regime is encountered when the OPO is operating with a net positive group velocity dispersion (GVD). The unchirped regime is achieved by going to net negative GVD using the prism sequence. The spectra illustrated in FIGS. 4A and 4B are typical of chirped pulses. The transition from chirped to unchirped pulses when going from positive to negative GVD is a smooth one. The unchirped regime is characterized by pulsewidths approximately 20% longer than the pump pulsewidth and greater, depending on the amount of negative GVD. The shortest pulses are encountered near zero GVD, where signal pulses as short as 84 femtoseconds were measured in the above-mentioned experimental set up.

Figure 5:
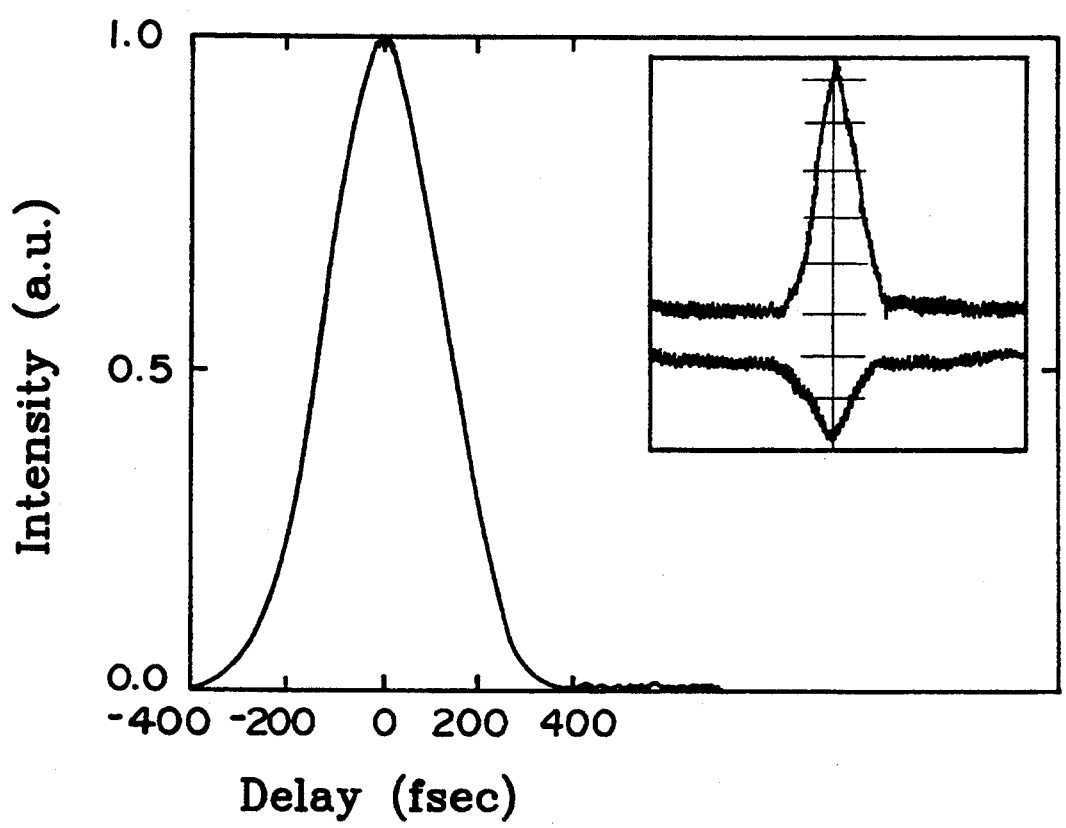
FIG. 5 illustrates an intensity autocorrelation of a 183 femtosecond idler pulse at 1.77 $\mu$m, the inset in the figure showing the interferometric autocorrelation.

The idler 44 is generated during each pass of the signal through the KTA crystal 24. In tests, the interferometric autocorrelation of the idler wave shows no sign of chirp regardless of whether the signal pulse is chirped or unchirped. Similarly, the spectra of the idler when the signal is chirped or unchirped are nearly identical. FIG. 5 shows the intensity and interferometric autocorrelation of the idler pulse with a pulsewidth of 183 fsec at a wavelength of 1.77 $\mu$m and a power of 80 mW. The contrast ratio of the interferometric autocorrelation for the idler pulses is less than 8:1. This is attributed to the scanning arm of the interferometer used in the tests requiring a small corner cube which limits the throughput of that arm. The shortest idler pulses, 148 fsec at a wavelength of 1.89 $\mu$m and a power of 40 mW, were observed for the chirped-pulse signal operation. The total OPO output power (signal plus idler) was greatest for the unchirped signal pulse regime.

Autocorrelation of the signal and idler may be accomplished using a 0.3 mm thick BBO crystal. Signal autocorrelation was measured in the experimental set up, using an RCA model C31034 photomultiplier tube (PMT), while an RCA model 7102 PMT was used for the idler autocorrelation.

It was noted that several non-phase-matched outputs accompanied the phase-matched outputs described above. Non-phase-matched second harmonic generation of the signal pulse as well as sum-frequency generation between the pump and signal and between the pump and idler are all present in the cavity 10.

Pulse widths on the order of 200 femtoseconds or less can be generated in the 425 $\mu$m region of the KTA OPO. The phase matching band width of the signal that will generate idler pulses in this region is approximately 13 nm, which is capable of supporting a 95 femtosecond pulse. The inverse group velocity mismatch (GVM) between the signal and pump in this region is less than 100 femtosecond per mm so that the signal pulse width should be on the order of 100 femtoseconds. The corresponding idler pulse width is on the same order, since the GVM between the idler and the pump is even less than that between the signal and pump.

The generation of pulses in the range of 84 femtoseconds for signal wave lengths in the 1.25 to 1.5 $\mu$m region are also possible with the KTA crystal, and pulses as short as 57 fsec should be possible. The phase matching bandwidth in this region is on the order of 40 nm, and the GVM between the pump and signal for KTA is less than 20 femtoseconds per mm, so pulses as short as 57 fsec should be possible. Further, the idler pulsewidth is the shortest fsec idler pulse in the infrared yet reported.

In summary, there has been described a high-repetition rate optical parametric oscillator based on the nonlinear optical crystal KTA. The OPO produces unchirped pulses as short as 84 femtosecond at 1.36 $\mu$m and 150 femtoseconds at 1.89 $\mu$m. The OPO can be tuned from 1.29 to 1.44 $\mu$m in the signal branch and from 1.83 to 1.91 μm in the idler branch with one set of mirrors, and with other mirrors the crystal operates in the 3-5 μm spectral range. A Ti:sapphire based pump allows the OPO to generate high power, broadly tunable pulses in accordance with the present invention. Although the invention is described in terms of a preferred embodiment, it will be apparent that variations and modifications may be made without departing from the true spirit and scope thereof, as set forth in the accompanying claims.

What is claimed is:

1. A broadly tunable optical parametric oscillator, comprising:
    an oscillator cavity including first and second reflectors defining a pump cavity;
    a nonlinear optical crystal located in said cavity;
    a femtosecond laser pumping source producing an output pumping beam having high repetition rate femtosecond pumping pulses;
    means directing said pumping beam onto a surface of said crystal in said pump cavity to stimulate generation of signal and idler beams in said crystal; said signal and idler beams having pulse widths of less than about 200 fs and having wavelengths between about 1 μm and about 5 μm;
    means directing a selected one of said signal and idler beams out of said oscillator cavity;
    means causing the other of said signal and idler beams to resonate in said oscillator cavity; and
    means transmitting a portion of said resonant beam out of said oscillator cavity to provide a femtosecond oscillator output beam.

2. The oscillator of claim 1, wherein said crystal is a $KTiOAsO_4$ crystal.

3. The oscillator of claim 2, wherein said laser pumping source is a Ti:Sapphire laser.

4. The oscillator of claim 2, wherein said oscillator cavity is a linear cavity having first and second spaced end mirrors aligned with an axis of said oscillator cavity.

5. The oscillator of claim 4, wherein said first and second end mirrors are aligned with said first and second reflectors defining said pump cavity.

6. The oscillator of claim 5, wherein said crystal is doped with indium.

7. The oscillator of claim 5, wherein said oscillator cavity end mirrors are flat, one of said mirrors being partially transmissive to provide an output coupler for said oscillator.

8. The oscillator of claim 1, wherein said signal beam is resonated in said oscillator cavity, and said idler beam is directed out of said oscillator cavity.

9. The oscillator of claim 8, wherein said first and second reflectors are curved and are aligned with said crystal to focus said signal beam for resonance in said oscillator cavity.

10. The oscillator of claim 9, further including a collimating mirror located to intercept said idler beam.

11. The oscillator of claim 9, wherein said signal beam has a wavelength range of from about 1 μm to about 5 μm.

12. The oscillator of claim 11, wherein said signal beam is a train of pulses having pulse widths in the femtosecond time domain.

13. The oscillator of claim 12, wherein the wavelength of said signal beam is tunable over said wavelength range.

14. The oscillator of claim 1, wherein said crystal is KTA.

15. The oscillator of claim 1, wherein said crystal is $KTiOAsO_4$ crystal, and wherein said signal beam is resonated in said oscillator cavity to produce an output beam comprising a train of pulses having wavelengths tunable from about 1 μm to about 5 μm and having pulse widths in the femtosecond time domain.

* * * * *